March 13, 1956  W. E. RENICK  2,737,974
AIRCRAFT RELIEF VALVE
Filed Nov. 29, 1951
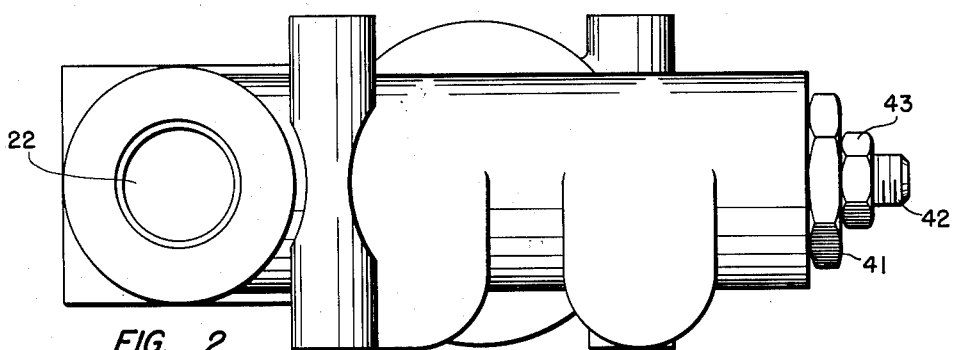
FIG. 2
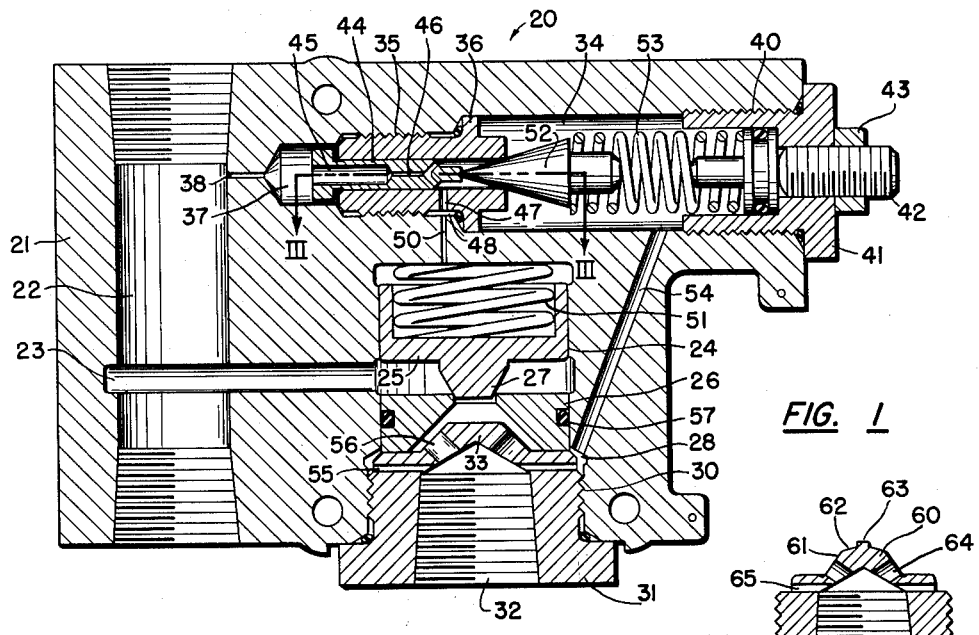
FIG. 1
FIG. 4
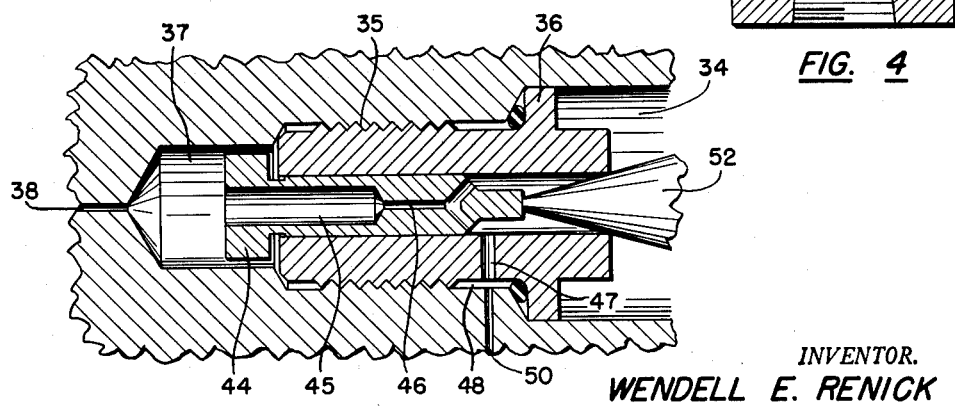
FIG. 3
INVENTOR.
WENDELL E. RENICK
BY
Herschel C. Omohundro

United States Patent Office 2,737,974
Patented Mar. 13, 1956

2,737,974

AIRCRAFT RELIEF VALVE

Wendell E. Renick, Grove City, Ohio, assignor to The Denison Engineering Company, Columbus, Ohio, a corporation of Ohio Application November 29, 1951, Serial No. 258,839

8 Claims. (Cl. 137—489)

This invention relates to hydraulic apparatus and is particularly directed to improvements in valve mechanisms employed in hydraulic systems to control the pressure existing in portions of the systems.

It has been found that relief valves with circular seats and poppet-type valves cooperating therewith to control the communication between the inlet and the outlet are generally objectionable due to the fact that when the fluid pressure increases enough to make the valve start to open the fluid flows through the minute crack between the valve and the seat and forms a rapidly moving cone shaped jet of atomized fluid which, when the pressure is high especially, causes a lot of objectionable vibration and noise as well as agitation and foaming of the oil. In my co-pending application Serial No. 737,983, filed March 28, 1947, now Patent No. 2,580,128, issued December 25, 1951, the poppet valve was provided with a button-like head to break up the jet of atomized fluid. This head partially eliminated the objections but because of the impingement of the fluid on the head, which formed a part of the valve, resistance to opening movement was encountered after the valve was cracked. An artificial condition was thus created which was difficut to counteract or control since it was not always present and varied greatly. An object of this invention is to provide a relief valve having the benefits of the previous valves without their attendant disadvantages.

An object of this invention also is to provide a pressure relief valve for use particularly in the hydraulic systems of aircraft in which the devices must be light in weight, compact and able to function under the most adverse operating conditions, the valve forming the subject matter of this invention being intended for use with fluids under high pressures.

Another object of this invention is to provide a pressure relief valve which is similar in nature and operating characteristics to the valve shown and described in the above mentioned copending application but which is modified by the addition of features which improve the operating characteristics, one feature being the placing of a baffle in the discharge outlet to reduce the velocity of fluid being discharged, to change the direction of flow thereof and cause the fluid to be discharged in a solid stream free from foam or other evidences of turbulence.

Still another object of the invention is the provision of a relief valve having an inlet and an outlet with a valve seat between them and a piston valve for cooperation with the seat to control fluid flow from the inlet to the outlet, a baffle with a frusto-conical center section being disposed between the outlet and the valve seat, openings being provided in the frusto-conical section, the baffle serving to obstruct the direct flow of fluid from the valve seat to the outlet causing the fluid to change its direction of flow one or more times before reaching the outlet.

A further object is to provide a relief valve of the type mentioned in the preceding paragraph with a pilot valve construction to control the action of the piston valve, the pilot valve having a spring-pressed valve responsive to the fluid pressure to establish communication between the control section of the piston valve chamber and the outlet, the connection with the outlet being located on the opposite side of the baffle from the valve seat so that no artifical conditions such as variations in pressure will be induced around the pilot valve by the opening of the main valve.

Further objects and advantages of the present invention will be apparent from the following description, reference being had to the accompanying drawings wherein a preferred form of embodiment of the invention is clearly shown.

In the drawings:

Fig. 1 is a vertical longitudinal sectional view taken through a relief valve formed in accordance with the present invention.

Fig. 2 is a plan view of the valve shown in Fig. 1, and

Fig. 3 is a detail horizontal sectional view taken on the plane indicated by the line III—III of Fig. 1.

Fig. 4 is a longitudinal sectional view of a modified form of fitting which may be used in the relief valve shown in Fig. 1.

Referring more particularly to the drawing the numeral 20 designates the relief valve in its entirety. The valve illustrated in the drawings includes a body 21 which may be formed in any suitable manner, one method of forming being casting, preferably from aluminum or alloys thereof to secure high strength and light weight. The body is provided adjacent one end with a bore 22 extending vertically through the body, this bore being threaded at both top and bottom ends for connection in a hydraulic system. Either of these ends will serve as an inlet or an outlet.

The bore 22 intersects a cored opening 23 which extends substantially horizontally in the body and terminates in spaced relation from the bore 22 in a chamber 24. This chamber is finished in one portion for the slidable reception of a piston valve 25. Another portion of this chamber is finished for the reception of a valve seat insert 26 with which the valve portion 27 of the piston valve is arranged to cooperate to control fluid flow from the bore 22 through the cored opening 23 to an outlet 28 located below the valve seat insert 26. This outlet is threaded as at 30 to receive a fitting 31 which has a threaded central opening 32 to receive an exhaust line and has a wall 33 at the inner end of the opening 32 which wall serves as a baffle to be presently described.

The body 21 is further provided at its upper portion with a bore 34 which is reduced as at 35 and threaded for the reception of a second valve seat insert 36. The bore 34 is further reduced as at 37, this portion terminating in an orifice 38 which establishes communication between the bore 34 and the bore 22. The outer end of bore 34 is threaded as at 40 for the reception of a plug 41, this member having a threaded opening for the adjustable reception of a screw 42, a lock nut 43 being threaded on the screw to maintain its positions of adjustment.

The insert 36 has a seat portion and a guide portion the latter receiving a push off piston 44 which is provided with a central passage 45 a portion of which is reduced and serves as an orifice 46; the orifice terminates in laterally directed extensions establishing communication between the opening 45 and the interior of the insert 36 between the guide portion and the seat portion. The insert is further provided with a lateral port 47 which establishes communication between the interior and an exterior groove 48, this groove being connected by a passage 50 with the inner end of the chamber 24. Through the provision of the orifice 38, the bore 34, opening 45, orifice 46 and its extensions, port 47 and passage 50, fluid is permitted to flow from the bore 22 into the inner end of the chamber 24 when the valve is in assembled condition. Fluid thus introduced will be disposed above the piston portion of the valve 25. This piston element is urged in an outward direction in the chamber 24 by a coil spring 51 disposed between the inner end of the chamber 24 and the inner end of a socket formed in the piston portion of the valve 25. This spring tends to hold the valve portion 27 in engagement with the seat 26 to prevent communication between the inlet of the valve and the outlet thereof.

The seat portion of the insert 36 is provided for engagement by a conical valve 52 which is urged toward the seat by a spring 53. The valve 52 constitutes a pilot valve since it controls the operation of the valve 27 in response to the variations in pressure in the hydraulic system. Valve 52 is constantly exposed to fluid pressure and controls communication between the interior of the insert 36 and the bore 34 beyond the insert 36, this portion of the bore being connected by an angular passage 54 with the outlet port. It will be noted from Fig. 1 that passage 54 terminates at the outlet side of the valve seat 26 in an annular space or manifold formed by the inner end of the fitting 31 and the adjacent casing wall and fluid flowing through the passage 54 will also flow from the manifold through laterally extending openings 55 formed in fitting 31 to the opening 32 therein from which it will flow through a conductor, not shown, to the reservoir of the hydraulic system.

The wall 33 at the inner end of the fitting 31 has a frusto-conical exterior configuration the inclined portions having passages 56 formed therein to establish communication between the outlet side of the seat 26 and the interior of the fitting 31. It will also be noted from Fig. 1 that the inner end of the fitting 31 engages the under side of the valve seat insert 26 and assist in locating and retaining this element in the valve body. Suitable sealing members 57 are provided in an angular groove formed in the insert to prevent leakage past the insert. The inner wall of the insert 26 is inclined downwardly and outwardly away from the seat, this wall and the upper surface of the wall 33 forming a substantially conical annular passge which leads from the opening in the valve seat insert to the angular openings 56 formed in the wall 33. This construction is important and forms the major portion of the subject matter of this invention.

The wall 33 has been given the frusto-conical formation to locate the flat upper surface of the wall in registration with and in close proximity to the opening in the valve insert, this opening being defined by the valve seat. When the valve 27 starts to move away from the seat during the operation of the valve, fluid will be permitted to flow between the valve and the seat and when the fluid is under high pressure, it will vaporize or break up into small particles which travel at high speed. In the absence of a baffle this jet of vapor churns up the fluid causing the discharge through the exhaust line to foam and thus create an undesirable condition. The agitation of the fluid also causes undersirable noise. Through the provision of the baffle wall 33 the jet of vapor is redirected laterally and flows downwardly between the insert 26 and the inclined wall of the baffle to the openings 56. By interrupting the jet and redirecting the flow, its rate of travel is decreased thus permitting the fluid particles to collect and flow through the exhaust line in a solid stream.

This valve functions in substantially the same manner as the valve shown in the copending application mentioned previously. Fluid under pressure is supplied to the bore 22; this fluid occupies the cored opening 23 and surrounds the valve 27 and space beneath the piston 25. Some of the fluid flows through the orifice 38 and the passages connected therewith to the inner end of the chamber 24 above the piston 25. When the system pressure is below that for which the valve has been set to operate the pressure in the passages and bores mentioned above is substantially equal. When this pressure approaches that for which valve 52 has been set the force of the fluid will tend to move valve 52 away from its seat. Continued increase in pressure will cause the valve to crack permitting some of the fluid to flow into the outer portion of the bore 34 and downwardly through passage 54 to exhaust. When the volume of fluid flowing past valve 52 increases sufficiently to allow the pressure beneath the piston valve 25 to move the valve upwardly in chamber 24 valve 27 will move away from seat 26 and fluid will be permitted to flow from the cored opening 23 to the exhaust. As long as fluid is supplied to the bore 22 it will be maintained at the pressure for which the valve 52 has been set. If the supply should be diminished valve 27 will seat and remain until the pressure is again increased sufficiently to move valve 52 away from its seat.

Through the provision of the baffle 33 an improved operation is secured. This operation is further augmented by connecting the passage 54 with the exhaust below or at the outlet side of the baffle wall 33. This location of the point of communication prevents the flow of fluid, when the main valve is opened from creating an artificial condition at the outlet side of valve 52. The push-off piston 44 with its orifice 46 functions in the same manner as in the previously mentioned copending application. The orifice 46 creates a pressure drop when fluid flows therethrough causing the piston 44 to increase the opening movement of the pilot valve 52 after the valve has once started to open.

It has been discovered, in using the relief valve 20, that when fluid flows past the valve 27 and strikes the flat surface on the baffle it is deflected toward one side or the other. This condition is aggravated when the piston is relatively loosely mounted in the body as it is in relief valves for aircraft where the valve body and piston are formed from different materials and are designed for operation at extremely low temperatures. In such cases the piston is apt to be forced toward one side causing the fluid to pass between the valve and its seat at the opposite side. When such condition occurs, the lateral deflection of the fluid creates an undesirable condition which tends to prevent the piston and valve from returning to centered position in the piston cylinder and valve seat. A fitting for the valve body outlet with a baffle construction designed to overcome the above outlined difficulty is shown in Fig. 4. This fitting indicated by the numeral 58, is substantially identical with the fitting 31 except for the shape of the baffle portion 60. In this modified fitting, the baffle 60 has a first conical portion 61 of relatively sharp inclination and a second, relatively flat conical portion 62. The latter portion registers with the opening in the valve seat and is impinged by the fluid flowing through the valve when it is opened. To prevent undesirable deflection of this fluid the conical portion 62 is provided with an upwardly projecting prong 63. This prong extends toward the opening in the valve seat and assists in breaking up the jet of fluid flowing through such opening. If the valve should be eccentrically disposed the prong will prevent all of the fluid from being deflected toward one side. The sharply inclined conical portion is provided with holes 64 to permit fluid to flow past the baffle, to the outlet. Holes 65 for the exhaust from the pilot valve are also provided in the fitting 58.

This valve may be mounted in any suitable manner the present illustration having a plurality of openings through which bolts or other fastening elements may extend to retain the body in connection with a support.

While the invention has been illustrated in only one form, it should be obvious that many minor changes may be made therein without departing from the spirit and scope of the invention as set forth in the following claims.

I claim:

1. A relief valve comprising a body having an inlet and an outlet; a valve seat between said inlet and outlet; a piston chamber in said body in registration with said valve seat; a piston valve disposed for movement in said piston chamber to engage the valve with said seat and disengage it therefrom; a passage in said body communicating at a first point with said inlet, at a second point with said piston chamber at the opposite side of the piston from said valve and at a third point with said outlet; a stationary baffle in said outlet between said valve seat and the point of communication of said outlet with said passage; and a pressure responsive pilot control valve in said passage between the points of communication thereof with said piston chamber and said outlet, said pilot control valve governing fluid flow through said passage.

2. A relief valve comprising a body having an inlet and an outlet; a valve seat between said inlet and outlet; a piston chamber in said body in registration with said valve seat; a piston valve disposed for movement in said piston chamber to cooperate with said valve seat and control communication between said inlet and outlet; a passage communicating with said piston chamber at both sides of said piston and with said outlet; a pilot valve in said passage between said chamber and said outlet for controlling the pressures on opposite sides of the piston for and the action of said piston valve; and a baffle disposed in fixed relation to and between said valve seat and said outlet, said baffle having a flat wall in registration with and normal to the axis of the opening surrounded by said valve seat and a frusto-conical wall extending from said flat wall, the frusto-conical wall having openings extending therethrough.

3. A relief valve comprising a body having an inlet and an outlet; a valve seat between said inlet and outlet; a piston chamber in said body in registration with said valve seat; a piston valve disposed for movement in said piston chamber to cooperate with said valve seat and control communication between said inlet and outlet; a passage communicating with said piston chamber at both sides of said piston and with said outlet; a pilot valve in said passage between said chamber and said outlet for controlling the pressures on opposite sides of the piston for and the action of said piston valve; and an inverted frusto-conical baffle disposed between said valve seat and said outlet, the top surface of said baffle being in registration with and substantially normal to the axis of the opening surrounded by said valve seat to be impinged by fluid flowing through said valve.

4. A relief valve comprising a body having an inlet and an outlet; a valve seat between said inlet and outlet; a piston chamber in said body in registration with said valve seat; a piston valve disposed for movement in said piston chamber to cooperate with said valve seat and control communication between said inlet and outlet; a passage communicating with said piston chamber at both sides of said piston and with said outlet; a pilot valve in said passage between said chamber and said outlet for controlling the pressures on opposite sides of the piston for and the action of said piston valve; and a stationary baffle between said valve seat and said outlet, said baffle having a flat wall in registration with the opening surrounded by said valve seat and an inclined annular wall extending away from the periphery of said flat wall, said inclined wall having openings extending therethrough substantially at right angles to the face thereof.

5. A relief valve comprising a body having an inlet and an outlet; a valve seat between said inlet and outlet; a piston chamber in said body in registration with said valve seat; a piston valve disposed for movement in said piston chamber to cooperate with said valve seat and control communication between said inlet and outlet; a passage communicating with said piston chamber at both sides of said piston and with said outlet; a pilot valve in said passage between said chamber and said outlet for controlling the action of said piston valve; and a stationary baffle between said valve seat and said outlet, said baffle having a wall in registration with the opening surrounded by said valve seat and openings extending through the baffle in eccentric relation to the opening in said valve seat.

6. A relief valve comprising a body having an inlet and an outlet; a valve seat in said body between said inlet and outlet, the wall in said body adjacent said valve seat flaring downwardly and outwardly toward said outlet; a piston chamber in said body in registration with said valve seat; a piston valve disposed for movement in said piston chamber to cooperate with said seat and control communication between said inlet and said outlet; a passage communicating with said piston chamber at both sides of said piston and with said outlet; a pilot valve in said passage between said chamber and said outlet responsive to the pressure in said inlet to control the operation of said piston valve; and a baffle in said body between the valve seat and said outlet, said baffle having an inclined wall surface parallel to and spaced from the flaring wall adjacent said seat, said inclined wall terminating in a flat wall normal to the axis of the opening surrounded by said valve seat and impinged by fluid flowing through such opening.

7. A relief valve comprising a body having an inlet and an outlet; a valve seat between said inlet and outlet; a piston chamber in said body in registration with said valve seat; a piston valve disposed for movement in said piston chamber to engage the valve with said seat and disengage it therefrom; a baffle member stationarily disposed in said outlet in spaced relation from said seat on the down stream side thereof, said member and body providing an annular manifold, said member having ports extending from said manifold to said outlet and from the space between said baffle and said valve seat to said outlet; a passage in said body extending from said inlet to said manifold, said passage communicating at an intermediate point with said piston chamber on the opposite side of said piston from said valve seat; and a pressure responsive valve in said passage between the points of communication thereof with said piston chamber and said manifold.

8. A relief valve comprising a body having an inlet and an outlet; a valve seat between said inlet and outlet; a piston chamber in said body in registration with said valve seat; a piston valve disposed for movement in said piston chamber to engage the valve with said seat and disengage it therefrom; said valve extending a limited distance beyond said seat when in engagement therewith and moving away from said seat to provide substantially unobstructed flow therethrough when said valve is open; a baffle member stationarily disposed in said outlet in spaced relation from and axial registration with the opening surrounded by said valve seat, said baffle member cooperating with said body to form an annular manifold and having sets of ports therein connecting said manifold and the space between said seat and baffle with said outlet; a passage extending from said inlet to said manifold, said passage communicating at an intermediate point with said piston chamber on the opposite side of said piston from said valve seat; and a pressure responsive valve in said passage between the points of communication with said piston chamber and said manifold.

References Cited in the file of this patent

UNITED STATES PATENTS

| | | |
|---|---|---|
| 1,461,039 | Leslie | July 10, 1923 |
| 2,043,453 | Vickers | June 9, 1936 |
| 2,388,820 | Bonnell | Nov. 13, 1945 |
| 2,580,128 | Renick | Dec. 25, 1951 |
| 2,619,103 | Davies | Nov. 25, 1952 |